(12) United States Patent
Kim et al.

(10) Patent No.: US 10,494,313 B2
(45) Date of Patent: Dec. 3, 2019

(54) THERMAL INSULATION FOAM HAVING LOW ADHESION FOR HIGH EXPLOSIVES

(71) Applicant: AGENCY FOR DEFENSE DEVELOPMENT, Daejeon (KR)

(72) Inventors: Jin-Seuk Kim, Daejeon (KR); Young-Hwan Kwon, Daegu (KR)

(73) Assignee: AGENCY FOR DEFENSE DEVELOPMENT, Daejeon (KR)

(*) Notice: Subject to any disclaimer, the term of this patent is extended or adjusted under 35 U.S.C. 154(b) by 389 days.

(21) Appl. No.: 15/408,553

(22) Filed: Jan. 18, 2017

(65) Prior Publication Data
US 2019/0010095 A1    Jan. 10, 2019

(30) Foreign Application Priority Data
Sep. 21, 2016 (KR) ..................... 10-2016-0120774

(51) Int. Cl.
| | |
|---|---|
| C06B 23/00 | (2006.01) |
| C08L 83/04 | (2006.01) |
| C08L 75/04 | (2006.01) |
| C08J 9/228 | (2006.01) |
| C08G 18/76 | (2006.01) |
| C08G 18/64 | (2006.01) |

(52) U.S. Cl.
CPC ........ *C06B 23/001* (2013.01); *C08G 18/6469* (2013.01); *C08G 18/76* (2013.01); *C08J 9/228* (2013.01); *C08L 75/04* (2013.01); *C08L 83/04* (2013.01); *C08J 2375/04* (2013.01); *C08J 2383/04* (2013.01); *C08L 2203/16* (2013.01)

(58) Field of Classification Search
CPC ................................ C06B 23/01; C08L 83/04
See application file for complete search history.

(56) References Cited

U.S. PATENT DOCUMENTS

| | | | | |
|---|---|---|---|---|
| 4,011,818 A | * | 3/1977 | Stosz, Jr. ............... | C08G 18/69 102/481 |
| 4,246,365 A | * | 1/1981 | Wiedermann .......... | C08G 18/10 521/172 |
| 4,530,939 A | * | 7/1985 | Rickle .................... | C08J 9/0061 521/110 |
| 4,772,639 A | * | 9/1988 | Pilger ................ | C08G 18/6688 521/124 |
| 9,062,954 B2 | | 6/2015 | Treadway et al. | |

FOREIGN PATENT DOCUMENTS

| | | |
|---|---|---|
| JP | 07-012499 A | 1/1995 |
| KR | 20000058166 A | 9/2000 |
| KR | 100978577 B1 | 8/2010 |
| KR | 10-2016-0094350 A | 8/2016 |

* cited by examiner

*Primary Examiner* — Aileen B Felton
(74) *Attorney, Agent, or Firm* — LRK Patent Law Firm

(57) ABSTRACT

Thermal insulation foam for high explosives is applied to the inner surface of warheads and guided weapons filled with high explosives, thus maximizing the storability and survivability of warheads and guided weapons despite changes in temperature and external environmental factors such as impacts. The thermal insulation foam includes porous microspheres, a prepolymer having a hydroxyl group, and an isocyanate, wherein the prepolymer includes any one selected from among a polybutadiene-, a polyester-, a polyether-, a polysiloxane-, and a fluorine-based prepolymer.

3 Claims, 7 Drawing Sheets

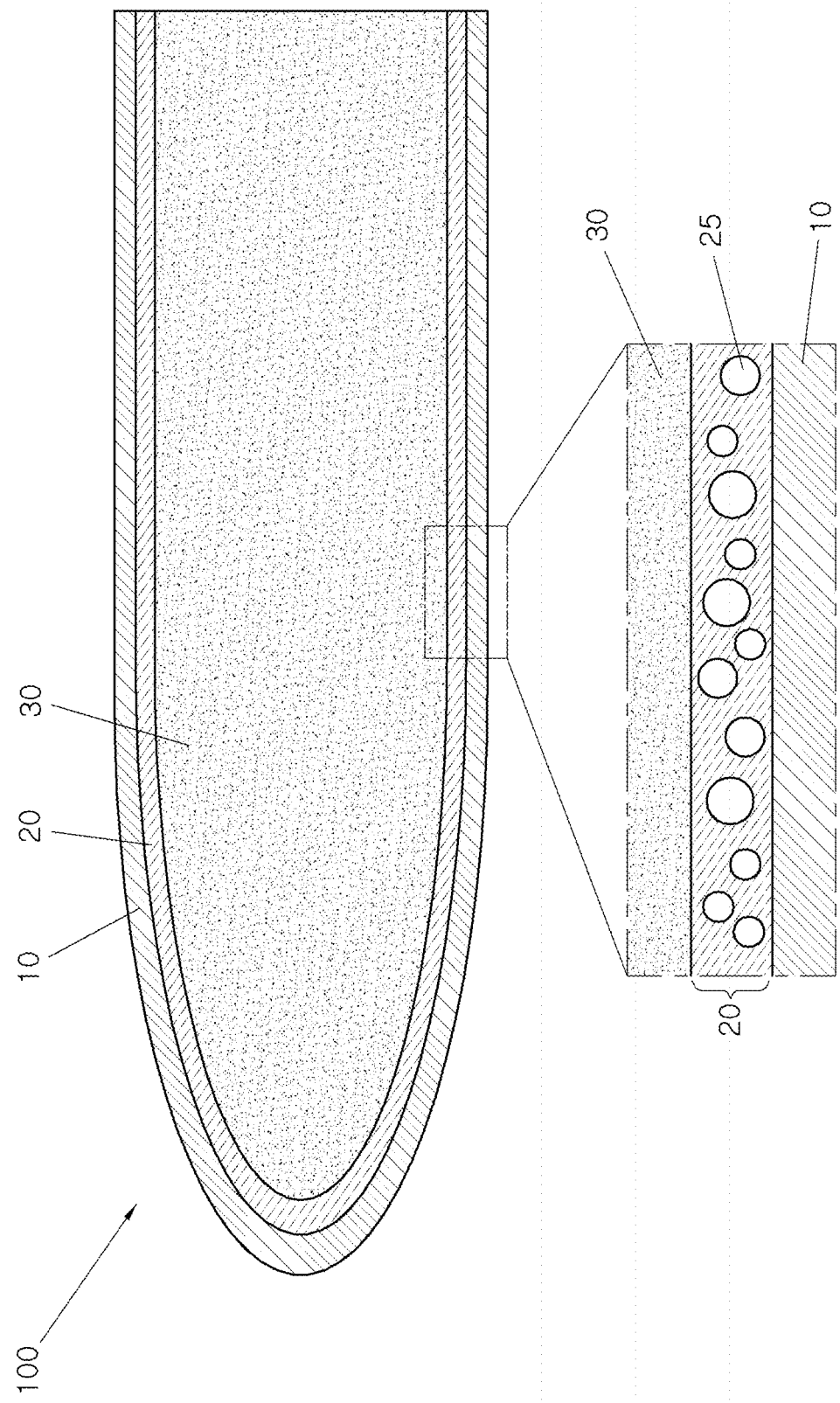

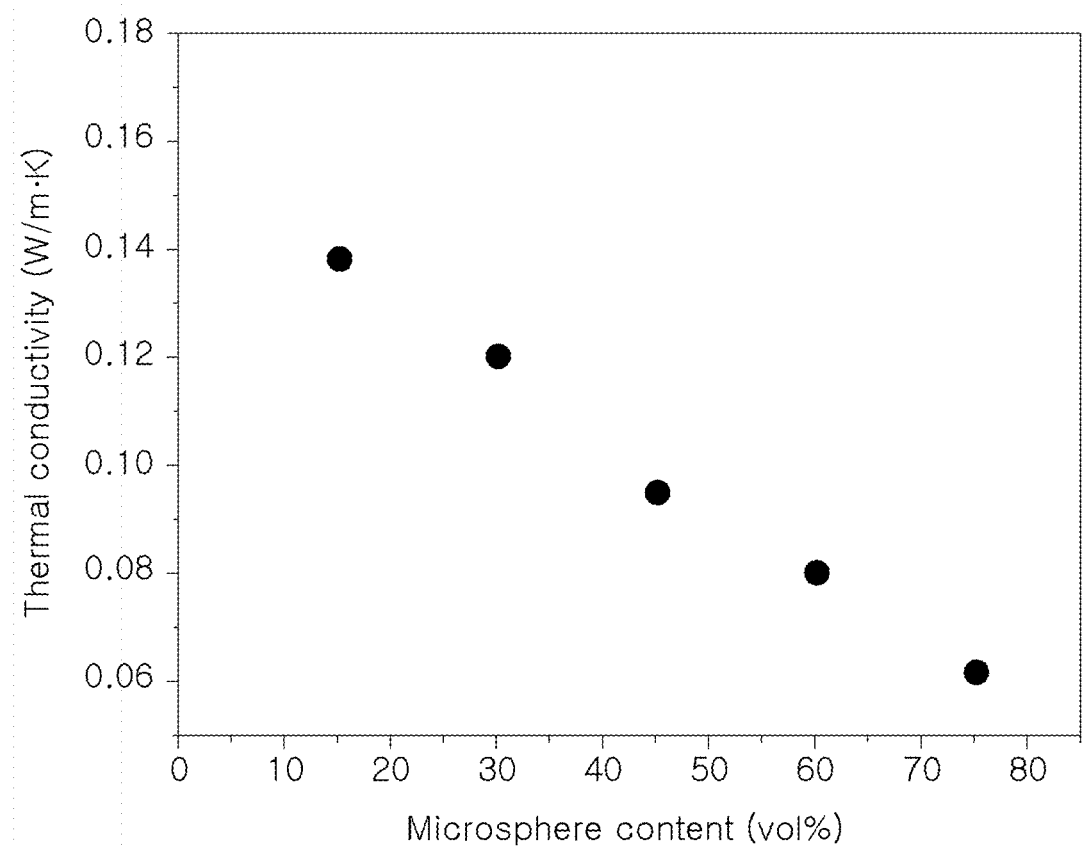

THERMAL INSULATION FOAM HAVING LOW ADHESION FOR HIGH EXPLOSIVES

CROSS REFERENCE TO RELATED APPLICATION

This application claims the benefit of Korean Patent Application No. KR 10-2016-0120774, filed Sep. 21, 2016, which is hereby incorporated by reference in its entirety into this application.

BACKGROUND OF THE INVENTION

1. Technical Field

The present invention relates to thermal insulation foam, and more particularly to thermal insulation foam having low adhesion for high explosives, which is applied to the inner surface of warheads and guided weapons filled with high explosives, thus maximizing the storability and survivability of warheads and guided weapons despite changes in temperature and external environmental factors such as impacts.

2. Description of Related Art

Warheads and guided weapons filled with high explosives are continuously and periodically exposed to changes in external temperature, severe environments such as fires, and external environmental factors such as impacts, during the storage, transportation and operation thereof.

In particular, changes in external temperature cause changes in high explosives placed in warheads and guided weapons, thus reducing the storage life of the high explosives. When high explosives is exposed to flame in a situation such as a fire, spontaneous ignition occurs due to rapid or slow heating, which, in the worst case, undesirably leads to an explosion.

Therefore, an asphalt liner, which may be economically and easily purchased and has high melt processability, is applied to the inner surface of warheads and guided weapons.

However, such an asphalt liner is problematic in terms of chemical compatibility with high explosives because about 6% of sulfur and about 25% of mineral matter contained in the asphalt are incompatible with high explosives. This problem is particularly relevant for ammonium nitrate (AN)-based high explosives.

Furthermore, the above problem causes another problem in that, in the process of separating the high explosives from the warheads and guided weapons, it is difficult to separate pure high explosives including no asphalt liner, and moreover, asphalt accelerates the aging of some kinds of high explosives, such as TNT, undesirably incurring instability in which exothermic decomposition may be initiated.

Hence, research is ongoing into alternatives to the asphalt liner. A hydroxyl-terminated polybutadiene (HTPB)-based polyurethane liner has been developed and may be applied to some guided weapons, but suffers from poor performance.

SUMMARY OF THE INVENTION

Accordingly, the present invention has been made keeping in mind the problems encountered in the related art, and the present invention is intended to provide thermal insulation foam for high explosives, which is applied to the inner surface of warheads and guided weapons filled with high explosives, thus maximizing the storability and survivability of warheads and guided weapons despite changes in temperature and external environmental factors such as impacts.

The present invention provides thermal insulation foam for high explosives, comprising: porous microspheres, a prepolymer having a hydroxyl group, and an isocyanate, wherein the prepolymer includes any one selected from among a polybutadiene-, a polyester-, a polyether-, a polysiloxane-, and a fluorine-based prepolymer.

The polysiloxane-based prepolymer having a hydroxyl group may be represented by Chemical Formula 1 below.

[Chemical Formula 1]

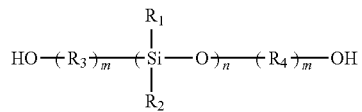

In Chemical Formula 1, $R_1$ or $R_2$ may be any one selected from among hydrogen, an alkyl group, a cycloalkyl group, and an aryl group, $R_3$ or $R_4$ may be any one selected from among methylene oxide, ethylene oxide, propylene oxide, and alkylene oxide, and the degree of, polymerization n may be a numeral ranging from 1 to 100, and the degree, of polymerization m may be a numeral ranging from 1 to 20.

The porous microspheres may include either or both of hollow glass microspheres and hollow organic microspheres having a polymer thin-film layer.

The isocyanate may be any one selected from among isophorone diisocyanate, 4,4-methylene diphenyl diisocyanate, toluene diisocynate, and hexamethylene diisocyanate.

The thermal insulation foam may further comprise a diol chain extender, plasticizer, a urethane reaction catalyst, or a curing catalyst.

The thermal insulation foam may be used as a liner disposed between an airframe and high explosives, and may have low thermal conductivity and low interfacial adhesion with the high explosives, compared to hydroxyl-terminated polybutadiene-based polyurethane.

According to the present invention, thermal insulation foam for high explosives has low thermal conductivity and high thermal stability and can thus minimize effects attributable to changes in external temperature, thereby prolonging the storage life of warheads and guided weapons compared to conventional materials, such as an asphalt liner or a hydroxyl-terminated polybutadiene (HTPB)-based polyurethane liner. When exposed to flame in a situation such as a fire, the thermal insulation foam of the invention increases the survival time of high explosives, thus preventing spontaneous explosions.

Also, compared to conventional materials, the thermal insulation foam of the invention has superior mechanical properties, and thus the high explosives can be made capable of surviving external impacts.

Also, compared to conventional materials, the thermal insulation foam of the invention has high compatibility and low interfacial adhesion with high explosives, thus preventing defects such as pores from being formed within the high explosives.

BRIEF DESCRIPTION OF THE DRAWINGS

FIG. 1 is a cross-sectional view showing a warhead including thermal insulation foam according to the present invention;

FIG. 3 is a graph showing the results of thermal conductivity of Examples 1 to 5 according to the present invention;

DESCRIPTION OF THE SPECIFIC EMBODIMENTS

Figure 2A:
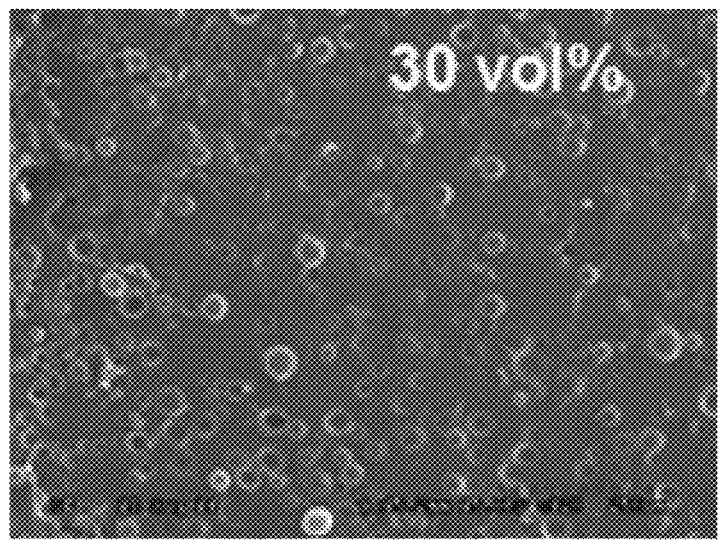
FIGS. 2A and 2B show scanning electron microscope (SEM) images of thermal insulation foam of Examples 2 and 4 according to the present invention.

Hereinafter, a detailed description will be given of thermal insulation foam for high explosives according to embodiments of the present invention taken in conjunction with the accompanying drawings. Such embodiments may be realized in different forms by those skilled in the art, and are not construed as limiting the present invention.

FIG. 1 schematically shows a warhead 100 including thermal insulation foam 20 according to an embodiment of the present invention. As shown in FIG. 1, the thermal insulation foam 20 is applied as a liner positioned between an airframe 10 that constitutes the outer surface of the warhead 100 and high explosives 30 that is charged in the airframe 10, and the thermal insulation foam 20 is positioned along the inner surface of the airframe 10.

The thermal insulation foam 20 functions to protect the high explosives 30 from changes in temperature and external environmental factors such as impacts, thereby increasing the storability and survivability of the high explosives 30 in the warhead 100.

Although not shown, the thermal insulation foam 20 may be applied to various kinds of guided weapons, in addition to the warhead 100.

The thermal insulation foam 20 of the present invention includes porous microspheres 25, a prepolymer having a hydroxyl group, and an isocyanate, and is configured such that porous microspheres 25 are distributed therein, as shown in FIG. 1.

The porous microspheres 25 are configured such that multiple pores are formed in the outer surface thereof and/or such that channels are formed therein, and preferably include either or both of hollow glass microspheres and hollow organic microspheres having a polymer thin-film layer, but the present invention is not particularly limited thereto.

The hollow glass microspheres have a microsphere size ranging from 2 to 150 μm, a bulk density ranging from 0.05 to 0.40 g/mL, a glass film thickness ranging from 0.05 to 5 μm, and a thermal conductivity ranging from 0.05 to 0.1 W/m·K.

The hollow organic microspheres having a polymer thin-film layer include both thermally expanded microspheres and non-expanded microspheres.

The thermally expanded microspheres have a diameter increased by 3 to 5 times and a volume increased by 50 to 100 times, compared to the non-expanded microspheres. In the present invention, the thermally expanded microspheres, having a microsphere size of 10 to 100 μm and a polymer thin-film layer with a thickness of 0.1 to 1 μm, are preferably used.

The prepolymer having a hydroxyl group may include any one selected from among a polybutadiene-, a polyester-, a polyether-, a polysiloxane- and a fluorine-based prepolymer. Preferably useful is a polysiloxane-based prepolymer having a hydroxyl group substituted at the end thereof or a fluorine-based prepolymer having low interfacial energy.

The polysiloxane-based prepolymer having a hydroxyl group substituted at the end thereof is represented by Chemical Formula 1 below.

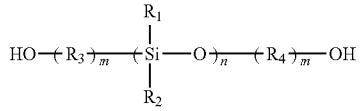

Chemical Formula 1

In Chemical Formula 1, $R_1$ and $R_2$, which are the same as or different from each other, are each independently any one selected from among hydrogen, an alkyl group, a cycloalkyl group, and an aryl group.

Also, $R_3$ and $R_4$, which are the same as or different from each other, are each independently any one selected from among methylene oxide, ethylene oxide, propylene oxide, and alkylene oxide.

Also, the degree of polymerization n may be a numeral ranging from 1 to 100, and the degree of polymerization m may be a numeral ranging from 1 to 20.

The isocyanate may be any one selected from among, isophorone diisocyanate (IPDI), 4,4-dimethylene diphenyl diisocyanate (MDI), toluene diisocyanate (TDI) and hexamethylene diisocyanate (HMDI), but the present invention is not limited thereto.

The thermal insulation foam may further include an additive such as a diol chain extender, a plasticizer, a urethane reaction catalyst, or a curing catalyst, in addition to the porous microspheres 25, the prepolymer having a hydroxyl group, and the isocyanate.

The curing catalyst may include at least one selected from among ferric acetylacetonate (FeAA$_3$), a tin-based curing catalyst such as dibutyl tin laurate, triphenyl bismuth and 3,5-dinitrosalicylic acid, but the present invention is not limited thereto.

In the thermal insulation foam 20 according to the present invention, the amount of the porous microspheres 25 may be about 10 to about 90 vol % based on the total volume of the thermal insulation foam 20. If the amount of the porous microspheres 25 falls out of the above range, the performance and processability of the thermal insulation, foam 20 may, deteriorate.

A better understanding of the present invention may be obtained through the following comparative example and examples, which are set forth to illustrate, but are not to be construed as limiting the scope of the present invention.

In Comparative Example or Examples, hydroxyl-terminated polybutadiene (HTPB) was supplied from the Agency for Defense Development, and the polysiloxane-based prepolymer of Chemical Formula 1, isophorone diisocyanate (IPDI) and a catalyst were purchased from Sigma-Aldrich.

As the porous microspheres 25, hollow glass microspheres were purchased from Sinosteel Maanshan Institute of Mining Research Co., Ltd, and thermally expanded microspheres (MFL-100MCA) and microspheres that had not been thermally expanded (MSH-320) were purchased from Matsumoto Yushi-Seiyaku Co., Ltd.

In Comparative Example or Examples, the evaluation method was performed as follows.

Thermal conductivity was measured at least three times at 30° C. using a thermal conductivity meter (Linseis Thermal Analysis THB-1) through a transient hot bridge method, and the measured values were averaged.

With regard to mechanical properties, the tensile stress, tensile strain and modulus were measured using a sample manufactured according to DIN-53504 type S2 by means of a texture analyzer (TA-HD+1500, Stable Micro System).

The above measurement was performed at a cross head speed of 50 mm/min and a load cell of 50 kgf, using at least three samples, and the measured values were averaged.

Also, surface energy was calculated by measuring a contact angle on the surface of a sample. According to a Sessile drop method, the contact angle was measured using water as a polar liquid and $CH_2I_2$ as a non-polar liquid by means of a contact angle meter (GSX, Surfacetech Co. Ltd). The surface energy was calculated based on a Wu's harmonic mean method.

In Comparative Example of the present invention, thermal insulation foam was manufactured by mixing hydroxyl-terminated polybutadiene-based polyurethane, currently useful as a liner for a guided weapon and the like, namely hydroxyl-terminated polybutadiene (HTPB), isophorone diisocyanate (IPDI), and an additive such as a diol chain extender, a plasticizer, a urethane reaction catalyst or a curing catalyst.

In Examples 1 to 5 of the present invention, thermal insulation foam was manufactured by mixing thermally expanded microspheres, a polysiloxane-based prepolymer of Chemical Formula 1, isophorone diisocyanate (IPDI), and an additive such as a diol chain extender, a plasticizer, a urethane reaction catalyst or a curing catalyst.

In Examples 1, 2, 3, 4 and 5, the thermally expanded microspheres in the thermal insulation foam 20 had microsphere contents of 15, 30, 45, 60 and 75 vol %, respectively.

Figure 2B:
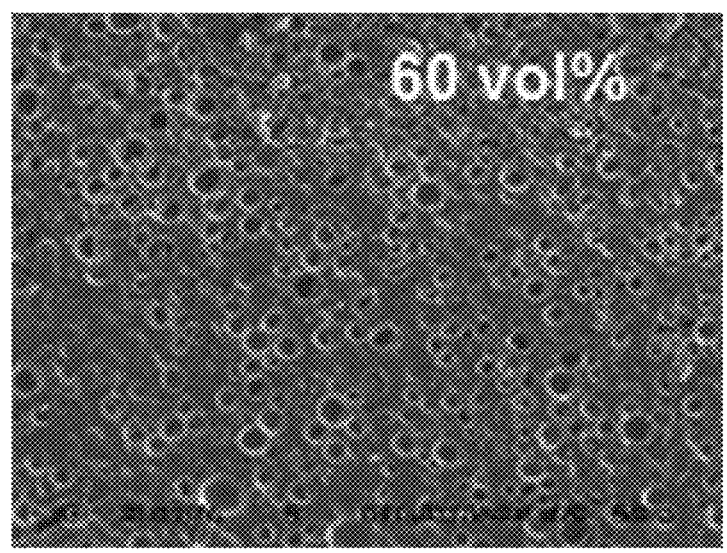

FIGS. 2A and 2B show SEM images of the cross-sections of Examples 2 and 4, in which the thermally expanded microspheres are distributed in the thermal insulation foam 20.

In Example 4 of FIG. 2B, rather than Example 2 of FIG. 2A, a relatively large amount of porous microspheres 25 was distributed in the thermal insulation foam.

The results of measurement of thermal conductivity, tensile stress, tensile strain, modulus and surface energy of Comparative Example and Examples 1 to 5 are given in Table 1 below.

TABLE 1

|  | Thermal conductivity (W/m · K) | Mechanical properties | | | Surface energy (mN/m) |
| --- | --- | --- | --- | --- | --- |
|  |  | Tensile stress (MPa) | Tension strain (%) | Modulus (%) |  |
| C. Ex. | 0.189 | 0.57 ± 0.03 | 584.5 ± 59.0 | 0.43 ± 0.01 | 43.3 |
| Ex. 1 | 0.138 | 4.15 ± 0.45 | 636.4 ± 70.6 | 4.13 ± 0.15 | 41.6 |
| Ex. 2 | 0.120 | 2.59 ± 0.06 | 472.7 ± 8.9 | 4.66 ± 0.10 | 40.5 |
| Ex. 3 | 0.095 | 2.05 ± 0.01 | 292.6 ± 56.9 | 4.71 ± 0.08 | 40.3 |
| Ex. 4 | 0.080 | 1.43 ± 0.04 | 71.8 ± 5.3 | 4.10 ± 0.11 | 41.0 |
| Ex. 5 | 0.061 | 1.10 ± 0.04 | 51.4 ± 2.0 | 3.50 ± 0.09 | 37.5 |

In Examples 1 to 5, the thermal conductivity was lower than that of Comparative Example, and was much lower than 0.75 W/m·K, which is the thermal conductivity of asphalt, which is useful as a conventional liner.

This means that the thermal insulation foam 20 of the present invention exhibits thermal insulation effects superior to those of the conventional liner, namely hydroxyl-terminated polybutadiene-based polyurethane and asphalt, thereby minimizing problems of decreased storability and survivability of the high explosives 30 due to changes in external temperature, compared to the conventional liner.

FIG. 3 is a graph showing changes in thermal conductivity in Examples 1 to 5. The thermal conductivity can be seen to decrease from Example 1 toward Example 5.

Thus, as the amount (vol %) of the thermally expanded microspheres in the thermal insulation foam 20 increases, the thermal insulation performance can also be found to increase.

In this way, when the amount (vol %) of the porous microspheres 25 in the thermal insulation foam 20 is adjusted, the thermal insulation performance of the thermal insulation foam 20 can be controlled.

As for mechanical properties, tensile stress was higher in Examples 1 to 5 than in Comparative Example, with up to an approximately 7-fold difference therebetween.

This means that the thermal insulation foam 20 of the present invention exhibits superior mechanical properties compared to hydroxyl-terminated polybutadiene-based polyurethane, which is used as the conventional liner, thereby minimizing problems of decreased storability and survivability of the high explosives 30 due to external impact.

Figure 4:
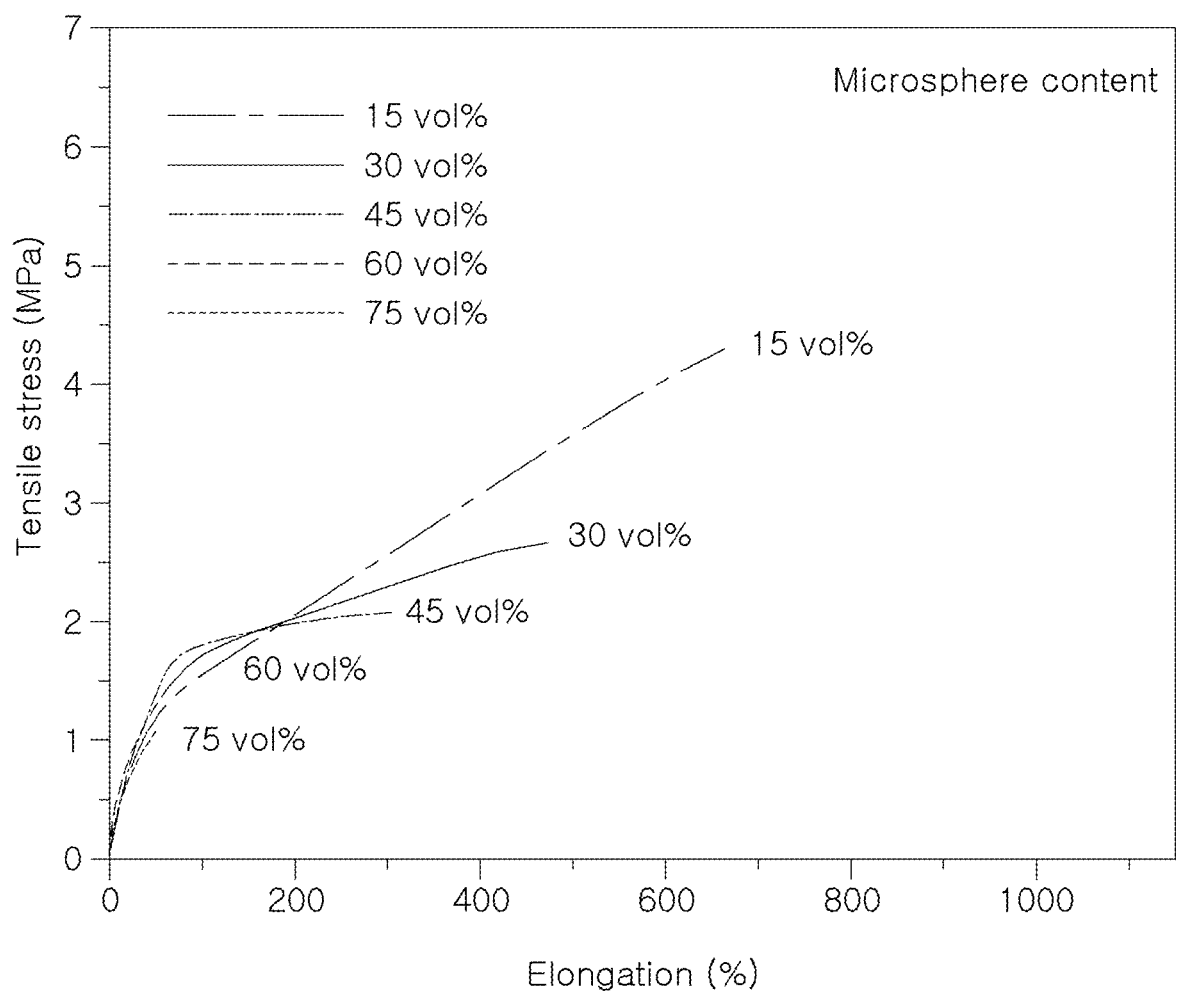
FIG. 4 is a graph showing the results of tensile testing of Examples 1 to 5 according to the present invention.

FIG. 4 is a graph showing the results of tensile testing in Examples 1 to 5. The tensile stress can be seen to decrease from Example 1 toward Example 5.

Thus, as the amount (vol %) of the thermally expanded microspheres in the thermal insulation foam 20 increases, the mechanical properties can be found to deteriorate. When the amount (vol %) of the porous microspheres 25 in the thermal insulation foam 20 is adjusted, the mechanical properties of the thermal insulation foam 20 can be controlled.

As for surface energy, Examples 1 to 5 exhibited low values compared to Comparative Example.

When the thermal insulation foam 20 is applied to the warhead 100, the low surface energy contributes to the formation of low interfacial adhesion with the high explosives 30.

As illustrated in FIG. 1, the liner is positioned between the airframe 10 and the high explosives 30 to form an adhesive interface with the high explosives 30. Here, when the interfacial adhesion is increased, defects such as pores in the high explosives 30 may result, and furthermore, it is difficult to separate pure high explosives 30 during the subsequent process of separating the high explosives 30 from the warhead 100.

Hence, low interfacial adhesion of the liner with the high explosives 30 is regarded as very important together with low thermal conductivity and high mechanical properties.

Figure 5:
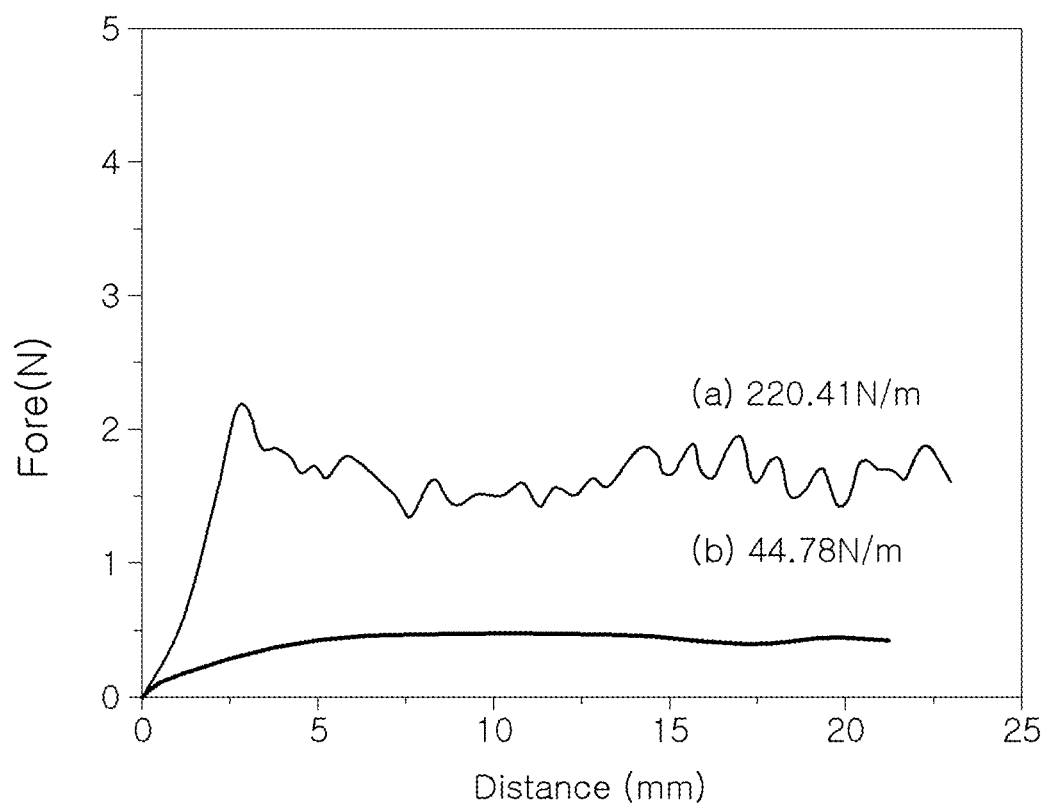
FIG. 5 is a graph showing the results of interfacial adhesion testing of HTPB-based polyurethane and polysiloxane-based polyurethane.
Figure 6A:
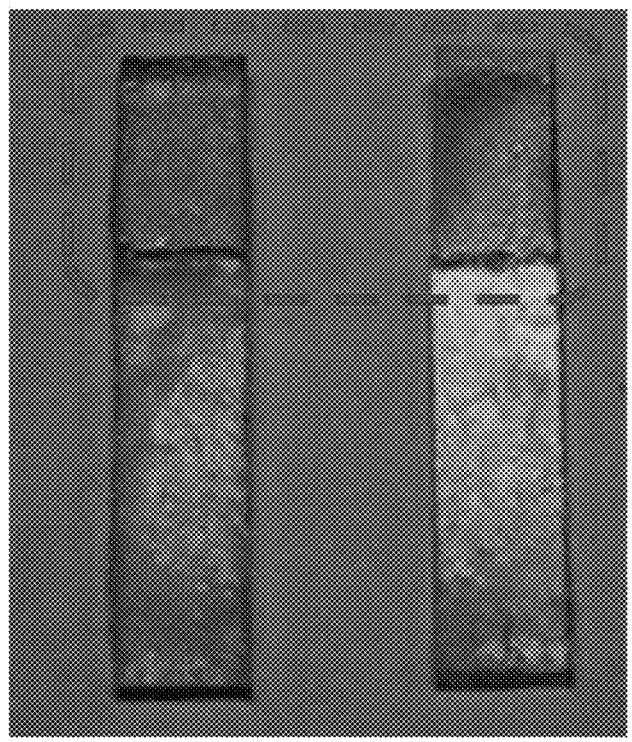
FIGS. 6A and 6B are photographs showing the adhesive surfaces of the samples subjected to interfacial adhesion testing of FIG. 5.
Figure 6B:
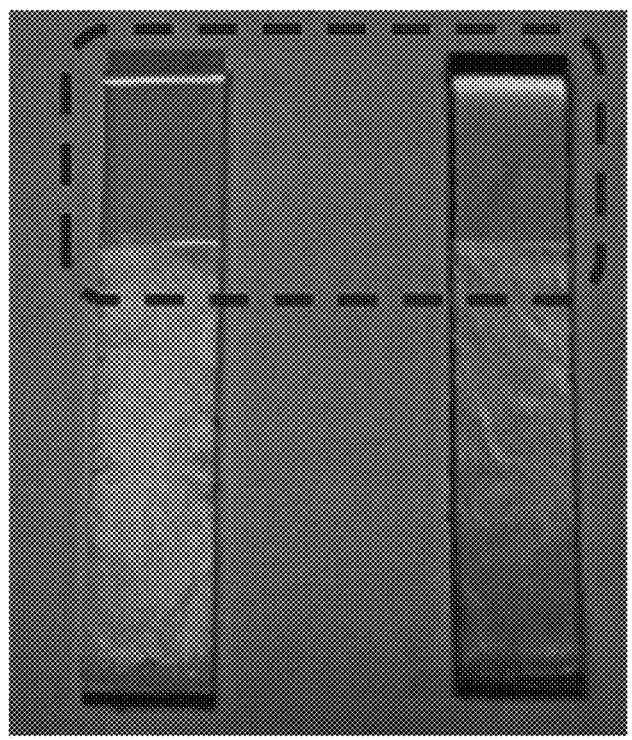

FIGS. 5 and 6A and 6B are a graph and photographs showing the results of testing of interfacial adhesion between the high explosives and the polysiloxane-based polyurethane using the polysiloxane-based prepolymer of Chemical Formula 1 for use in the thermal insulation foam 20 of the invention and the HTPB-based polyurethane useful as the conventional liner.

The interfacial adhesion test was performed using a hydroxyl-terminated polybutadiene (HTPB)-based polyurethane, which is widely useful as the polymer for plastic bonded explosive (PBX).

A sample for the interfacial adhesion test was manufactured as follows.

On 2 mm thick samples of HTPB-based polyurethane and polysiloxane-based polyurethane, HTPB-based polyurethane, as a replacement for plastic bonded explosive (PBX), was directly poured and cured, thus manufacturing an HTPB-based polyurethane/HTPB-based polyurethane sample and a polysiloxane-based polyurethane/HTPB-based polyurethane sample having a two-layered structure. As such, adhesion was prevented from occurring at portions other than the adhesive surfaces.

Using a texture analyzer, tensile testing of the HTPB-based polyurethane/HTPB-based polyurethane sample and the polysiloxane-based polyurethane/HTPB-based polyurethane sample was carried out, and the interfacial adhesion required to completely separate respective adhesive surfaces was measured.

FIG. 6A shows the results of tensile testing of the HTPB-based polyurethane/HTPB-based polyurethane sample, and FIG. 6B shows the results of tensile testing of the polysiloxane-based polyurethane/HTPB-based polyurethane sample.

The HTPB-based polyurethane/HTPB-based polyurethane sample exhibited interfacial adhesion of about 220.41 N/m, whereas the polysiloxane-based polyurethane/HTPB-based polyurethane sample had interfacial adhesion of about 44.78 N/m, which is about ⅕ of 220.41 N/m.

Compared to the HTPB-based polyurethane/HTPB-based polyurethane sample, the polysiloxane-based polyurethane/HTPB-based polyurethane sample can be found to exhibit low interfacial adhesion.

Accordingly, the interfacial adhesion with the high explosives 30 in real-world applications can be assumed to be low in the polysiloxane-based polyurethane used for the thermal insulation foam 20 of the present invention, compared to the HTPB-based polyurethane used as the conventional liner.

As is apparent from FIGS. 6A and 6B showing the two samples after the actual tensile test, the HTPB-based polyurethane/HTPB-based polyurethane sample of FIG. 6A exhibited very rough separated adhesive surfaces. This is because the interfacial adhesion was increased due to interpenetration.

In contrast, in the polysiloxane-based polyurethane/HTPB-based polyurethane sample of FIG. 6B, the separated adhesive surfaces were very smooth.

The difference in interfacial adhesion is considered to be due to the different surface energy values. The lower the surface energy, the lower the interfacial adhesion with the high explosives 30.

The thermal insulation foam 20 of the present invention has low surface energy compared to the hydroxyl-terminated polybutadiene (HTPB)-based polyurethane used as the conventional liner, thus exhibiting low interfacial adhesion with the high explosives 30 to thereby minimize the generation of defects such as pores in the high explosives 30. Furthermore, in the process of separating the high explosives 30 from the warhead 100, the purity of the separated high explosives 30 can be effectively increased.

As a consequence, the thermal insulation foam of the present invention has low thermal conductivity, thereby manifesting superior thermal insulation performance and prolonging the storage life of warheads and guided weapons even under changes in external temperature. When exposed to flame in a situation such as a fire, the thermal insulation foam of the present invention increases the survival time of the high explosives, thereby preventing spontaneous explosions.

The thermal insulation foam of the invention can exhibit superior mechanical properties compared to the polymer material used as the conventional liner, thus effectively maintaining the ability of the high explosives to survive an external impact. Also, the thermal insulation foam of the invention has low interfacial adhesion with the high explosives to thus minimize the generation of defects in the high explosives and increase the purity of the high explosives separated from the warhead.

The method of manufacturing the thermal insulation foam 20 of the present invention is described below.

The method includes the steps of primarily mixing a prepolymer having a hydroxyl group with porous microspheres 25 in the presence of a solvent, performing secondary mixing at reduced pressure and a temperature ranging from 40 to 70° C. while removing water and bubbles, performing tertiary mixing while adding an isocyanate at a temperature ranging from 20 to 40° C. and removing bubbles, performing quaternary mixing with the addition of a curing catalyst, and curing the mixture at a temperature ranging from 40 to 100° C.

The aforementioned embodiments regarding the thermal insulation foam for high explosives according to the present invention are preferably provided so that the present invention may be performed by those skilled in the art, and the above embodiments and the appended drawings are merely set forth to illustrate but are not construed to limit the scope of the present invention. Accordingly, those skilled in the art will appreciate that various modifications, additions and substitutions are possible, without departing from the scope and spirit of the invention as disclosed in the accompanying claims.

Unless otherwise defined, all terms including technical and scientific terms used herein have the same meanings as commonly understood by those skilled in the art to which the present invention belongs. It will be further understood that terms, e.g., those defined in commonly used dictionaries, should be interpreted as having a meaning that is consistent with their meaning in the context of the relevant art and are not to be interpreted as having an idealized or overly formal sense unless expressly so defined herein.

As used herein, the singular forms are intended to include the plural forms as well, unless the context clearly indicates otherwise. It will be further understood that the terms "comprise", "include", "have", etc. when used in this specification, specify the presence of stated elements or steps but do not preclude the presence or addition of one or more other elements or steps.

What is claimed is:

1. A thermal insulation foam for high explosives, comprising:
   porous microspheres,
   a prepolymer having a hydroxyl group; and
   an isophorone diisocyanate,
   wherein the prepolymer comprises a polysiloxane-based prepolymer,
   wherein the polysiloxane-based prepolymer having a hydroxyl group is represented by Chemical Formula 1 below:

[Chemical Formula 1]

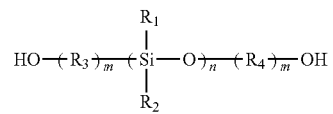

wherein $R_1$ or $R_2$ is any one selected from among hydrogen, an alkyl group, a cycloalkyl group, and an aryl group, $R_3$ or $R_4$ is any one selected from among methylene oxide, ethylene oxide, propylene oxide, and alkylene oxide, and a degree of polymerization n is a numeral ranging from 1 to 100, and a degree of polymerization m is a numeral ranging from 1 to 20.

2. The thermal insulation foam of claim 1, wherein the porous microspheres comprise either or both of hollow glass microspheres and hollow organic microspheres having a polymer thin-film layer.

3. The thermal insulation foam of claim 1, further comprising a diol chain extender, a plasticizer, a urethane reaction catalyst, or a curing catalyst.

* * * * *